United States Patent Office 3,294,658
Patented Dec. 27, 1966

3,294,658
SELECTIVE POLYMERIZATION OF UNSATURATED EPOXIDES
George J. Atchison, Midland, and Raymond M. Narlock, Bay City, Mich., assignors to The Dow Chemical Company, Midland, Mich., a corporation of Delaware
No Drawing. Filed July 22, 1963, Ser. No. 296,475
3 Claims. (Cl. 204—159.22)

This invention relates to a novel method for inducing polymerization through the epoxy group of compounds containing in their molecular structure both an epoxy group and polymerizable olefinic unsaturation. The invention relates more particularly to the selective polymerization of the monoepoxides of butadiene and butadiene dimer, which epoxides are described more precisely by the names 2,3-epoxy-1-butene and 1,2-epoxy-4-vinylcyclohexane, respectively.

Compounds having in their structure both an epoxy group and polymerizable olefinic unsaturation have been selectively polymerized in the past through one linkage to produce polymers containing the other polymerizable linkage essentially unchanged. By then attacking the unpolymerized groups in such polymers, these intermediate polymers can be modified by further polymerization, copolymerization, or cross-linking. In this way, resins having a very wide range of properties can be prepared, depending upon the monomers employed and the sequence of reactions which is chosen.

Selective polymerization through the epoxy groups of such compounds produces polyethers which contain reactive olefinic unsaturation. Ionic catalysts such as alkali metal hydroxides, trimethylamine, boron trifluoride, toluenesulfonic acid, acid treated clays, zinc chloride, and other acidic or basic materials capable of polymerizing ethylene oxide have been used to initiate this type of selective polymerization.

Catalysts of a different nature are conventionally used to cause selective polymerization through the olefinic bonds of such mixed monomers. Polymers are thereby produced wherein the epoxide linkages remain essentially intact and unaffected. Free radical initiators such as peroxides, persulfates, and azo compounds as well as exposure to ultraviolet light or heating in the presence of oxygen are known to cause polymerization of the olefinic group in such compounds without substantially affecting the epoxide group. It is also known that in many cases, high energy radiation such as gamma rays, X-rays, and accelerated electrons will also initiate the polymerization of ethylenically unsaturated monomers.

It is unexpected and surprising, therefore, to find that in the case of particular compounds containing both an epoxy group and ethylenic unsaturation, exposure of these compounds to high energy ionizing radiation results largely in polyether formation rather than polymerization of the unsaturated portions. Specifically, it has been found that exposure of the monoepoxides of butadiene and butadiene dimer to high energy radiation causes the formation of polyethers by opening of the epoxide rings in preference to polymerization of the vinyl groups. The polyether products are generally viscous oils of relatively low molecular weight and they are thought to consist essentially of recurring units of the type

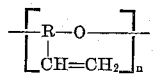

wherein $n$ is an integer greater than one and R is a divalent ethylene or cyclohexylene radical which has a vinyl substituent as shown. These vinyl substituted polyethers can be further reacted to make other products, for example, by conventional reaction with epoxides to make polyethers of higher molecular weight or by homopolymerization or copolymerization of the vinyl groups to make cross-linked polymers as shown by Strain, U.S. 2,765,296. Particularly pure vinyl-substituted polyethers which are free of ionic catalysts are produced by this method as compared to the similar polyethers available from prior art processes.

Any high energy radiation such as gamma rays, alpha rays, beta rays, X-rays, or accelerated electron beams is suitable to catalyze this selective polymerization. Beams of accelerated electrons are preferred because of the higher electron densities obtainable. The yield of polyether is dependent upon the total radiation dosage and the particular monomer employed. Absorption by butadiene monoxide (3,4-epoxy-1-butene) of 10–20 megarads of radiation causes essentially complete conversion of the epoxide to polyether while the same dosage applied to butadiene dimer monoxide (1,2-epoxy-4-vinylcyclohexane) results in about 5–15% conversion of epoxide to polyether. A field of high energy radiation having an intensity of from about 0.1 to about 100 megarads per hour is necessary for practical operation of the process.

The polymerization reaction is essentially independent of temperature. Irradiation at liquid air temperature gives about the same results as are obtained at room temperature or above. Operation at about 0–30° C. is preferred for convenience.

Example 1

A sample of 38.3 g. of 1,2-epoxy-4-vinylcyclohexane was exposed to the central portion of an unscanned beam of accelerated electrons produced by a Van de Graaff accelerator. The geometry of the irradiation cell and beam measuring apparatus was such that with a total spot beam of 40 microamperes from the accelerator the defined portion impinging on the sample deposited energy in the sample at a rate of $5 \times 10^{-3}$ gram megarads per second per microampere of total beam current. Irradiation of the stirred sample was continued at 0–5° C. under a nitrogen atmosphere to a total absorbed dosage of 20 megarads. After irradiation, the sample was transferred to a still pot and distilled at room temperature under 0.1 mm. Hg absolute pressure to separate unchanged starting material, leaving as the distillation residue, 4.9 grams of a viscous oil. Analytical examination of this oil showed that it was essentially a polyether formed by opening of the epoxide ring with most of the vinyl unsaturation remaining unchanged. The average molecular weight of the oil proved to be about 372, indicating that the material was largely a trimer of the starting compound.

Examples 2–6

Samples of 47 g. of 1,2-epoxy-4-vinylcyclohexane were irradiated according to the procedure of Example 1 except that an unscanned beam current of 2 microamperes was completely absorbed in the sample and the radiation dosage and the temperature were varied. The results are shown in the following table.

| Ex. | Dosage, Megarads | Temp., ° C. | Polymer | | |
|---|---|---|---|---|---|
| | | | Percent Yield [1] | Mol. Wt. | Percent Unreacted C=C [2] |
| 2 | 10 | 20–23 | 5.3 | 394 | 58 |
| 3 | 20 | 22 | 10.3 | 356 | 71 |
| 4 | 40 | 23–25 | 15.7 | 375 | 73 |
| 5 | 20 | 23–68 | 15.0 | 367 | 76 |
| 6 | 20 | −25–0 | 8.0 | 370 | 54 |

[1] Weight percent of starting material. No unreacted epoxy groups were found in any of the polymers obtained.
[2] Percent of original vinyl unsaturation remaining in the polymer.

Examples 7–8

Two samples of 1,2-epoxy-4-vincylcyclohexane were put into shallow dishes so as to form layers 0.66 gram per square centimeter in thickness. The dishes were covered with thin polyethylene film, cooled with solid carbon dioxide and with liquid nitrogen, respectively, and irradiated at a distance of 24 inches below the exit window of a Van de Graaff electron accelerator for 57.5 minutes with an unscanned beam of 10 microamperes to a total absorbed dosage of 10 megarads. After the irradiation, the samples were allowed to warm to room temperature and the non-volatile residue was separated as described in Example 1. The results obtained are listed below.

| Example | Temp., °C. | Polymer Percent Yield | Polymer Percent Unreacted C=C |
|---|---|---|---|
| 7 | −78 | 9.0 | 86 |
| 8 | −195 | 6.0 | 81 |

The polymers obtained were similar to those made in Examples 1–6.

Examples 9–11

Three samples of 1,2-epoxy-4-vinylcyclohexane were irradiated essentially as described in Example 1 to a total dosage of 20 megarads but with the geometry of the irradiation cell such that unscanned beam currents of 4, 8, and 16 microamperes, respectively, were completely absorbed in the samples. The yield of polymer in each case was 5.0%, 5.2%, and 7.0% by weight of the starting monomer. Evidently the yield is dependent on the total dosage rather than on the dosage rate. The products were similar to that of Example 1.

Example 12

A sample of 3,4-epoxy-1-butene was irradiated as in Example 1 to a total dosage of 20 megarads. The product was a polyether containing vinyl substituents but no detectable residual epoxide groups. This epoxide reacted under irradiation similarly to but much more rapidly than 1,2-epoxy-4-vinylcyclohexane. The polyether product was a thick, viscous liquid similar in appearance to the polyether product of Example 1.

In the manner shown in the above examples, mixtures in any proportion of 3,4-epoxy-1-butene and 1,2-epoxy-4-vinylcyclohexane are irradiated to produce mixed vinyl substituted polyethers by selective epoxide copolymerization.

Other compounds having as functional groups both an epoxide group and ethylenic unsaturation are found not to form polyethers in significant quantities under the influence of high energy radiation. The behavior of these related compounds under irradiation ranges from degradation to vinyl polymerization with some showing little or no reaction. Illustrative results are listed in Examples 13–17.

Examples 13–17

Other compounds containing both an epoxide linkage and aliphatic unsaturation were exposed to an accelerated electron beam as described in Example 1. The results of each such experiment are listed in the table below.

| Compound | Results |
|---|---|
| 1,2-epoxy-4-isopropenyl-1-methyl-cyclohexane. | No epoxy polymerization. |
| 1-(2,3-epoxypropoxy)-1-ethynylcyclohexane. | Do. |
| Allyl 2,3-epoxy propyl ether | Degradation products formed. |
| 2,3-epoxy propyl acrylate | Rapid vinyl polymerization. |
| Allyl 9,10-epoxystearate | No reaction. |

The above material were irradiated with total dosages of from 20 to 100 megarads at room temperature.

We claim:
1. A process for making a polyether containing vinyl substituents, which process comprises subjecting at least one substance of the group 3,4-epoxy-1-butene and 1,2-epoxy-4-vinylcyclohexane to a field of high energy radiation of an intensity of about 0.1 to about 100 megarads per hour and separating said polyether from the irradiated substance.
2. The process of claim 1 wherein the substance is 3,4-epoxy-1-butene.
3. The process of claim 1 wherein the substance is 1,2-epoxy-4-vinylcyclohexane.

References Cited by the Examiner

UNITED STATES PATENTS

| 2,687,406 | 8/1954 | Foster | 260—88.3 |
| 2,959,531 | 11/1960 | Wheelock | 204—159.22 |
| 3,031,439 | 4/1962 | Bailey | 260—88.3 |

MURRAY TILLMAN, *Primary Examiner.*

N. F. OBLON, *Assistant Examiner.*